(12) United States Patent
Chen

(10) Patent No.: US 8,738,278 B2
(45) Date of Patent: May 27, 2014

(54) TWO-WHEEL, SELF-BALANCING VEHICLE WITH INDEPENDENTLY MOVABLE FOOT PLACEMENT SECTIONS

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 0 days.

(21) Appl. No.: 13/764,781

(22) Filed: Feb. 11, 2013

(65) Prior Publication Data

US 2013/0238231 A1    Sep. 12, 2013

Related U.S. Application Data

(60) Provisional application No. 61/597,777, filed on Feb. 12, 2012.

(51) Int. Cl.
*B62D 61/00* (2006.01)

(52) U.S. Cl.
USPC ............... 701/124; 701/36; 701/69; 701/99; 280/87.1; 180/218; 180/220; 180/224

(58) Field of Classification Search
None
See application file for complete search history.

(56) References Cited

U.S. PATENT DOCUMENTS

| | | | |
|---|---|---|---|
| D601,922 S * | 10/2009 | Imai et al. ................... D12/1 |
| 8,225,891 B2 * | 7/2012 | Takenaka et al. ............. 180/7.1 |
| 2004/0005958 A1 * | 1/2004 | Kamen et al. ................. 482/51 |
| 2004/0262871 A1 * | 12/2004 | Schreuder et al. .......... 280/87.1 |
| 2006/0202439 A1 * | 9/2006 | Kahlert et al. ............. 280/47.24 |
| 2008/0029985 A1 * | 2/2008 | Chen ........................ 280/87.042 |
| 2008/0147281 A1 * | 6/2008 | Ishii et al. ..................... 701/49 |
| 2009/0032323 A1 * | 2/2009 | Kakinuma et al. ............ 180/218 |
| 2009/0078485 A1 * | 3/2009 | Gutsch et al. ................ 180/218 |
| 2009/0105908 A1 * | 4/2009 | Casey et al. .................... 701/41 |
| 2010/0025139 A1 * | 2/2010 | Kosaka et al. ............... 180/218 |
| 2010/0114468 A1 * | 5/2010 | Field et al. .................... 701/124 |
| 2010/0121538 A1 * | 5/2010 | Ishii et al. .................... 701/48 |
| 2010/0222994 A1 * | 9/2010 | Field et al. .................... 701/124 |
| 2010/0237645 A1 * | 9/2010 | Trainer ......................... 296/21 |
| 2011/0209929 A1 * | 9/2011 | Heinzmann et al. ......... 180/6.2 |
| 2011/0220427 A1 * | 9/2011 | Chen .............................. 180/21 |
| 2011/0221160 A1 * | 9/2011 | Shaw ........................... 280/205 |
| 2011/0238247 A1 * | 9/2011 | Yen et al. ....................... 701/22 |
| 2012/0205176 A1 * | 8/2012 | Ha et al. ....................... 180/220 |
| 2012/0239284 A1 * | 9/2012 | Field et al. .................... 701/124 |
| 2012/0290162 A1 * | 11/2012 | Stevens et al. ................. 701/22 |
| 2013/0032422 A1 * | 2/2013 | Chen ............................ 180/218 |
| 2013/0032423 A1 * | 2/2013 | Chen ............................ 180/218 |
| 2013/0105239 A1 * | 5/2013 | Fung ........................... 180/218 |
| 2013/0228385 A1 * | 9/2013 | Chen ............................ 180/6.5 |

* cited by examiner

*Primary Examiner* — Jonathan M Dager

(57) ABSTRACT

A two-wheel, self-balancing personal vehicle having independently movable foot placement sections. The foot placement sections have an associated wheel, sensor and motor and are independently self-balancing which gives the user independent control over the movement of each platform section by the magnitude and direction of tilt a user induces in a given platform section. Various embodiments are disclosed including those with a continuous housing, discrete platform sections and/or tapering platform sections.

9 Claims, 4 Drawing Sheets

TWO-WHEEL, SELF-BALANCING VEHICLE WITH INDEPENDENTLY MOVABLE FOOT PLACEMENT SECTIONS

CROSS REFERENCE TO RELATED APPLICATIONS

The present application claims the benefit of provisional application No. 61/597,777, filed Feb. 12, 2012, for a Two-Wheeled Self-Balancing Vehicle by the inventor herein.

FIELD OF THE INVENTION

The present invention relates to two-wheel, self-balancing vehicles and, more specifically, to such vehicles with two platform sections or areas that are independently movable with respect to one another and that thereby provide independent control and/or drive of the wheel associated with the given platform section/area.

BACKGROUND OF THE INVENTION

A first group of prior art two-wheel self-balancing vehicles is represented by a product known commonly as the "Segway." This product is disclosed in U.S. Pat. No. 6,302,230, issued to Sramek et al (the '230 patent). While a contribution in the field, the Segway and like devices are disadvantageous in that they are large, heavy and expensive, i.e., too heavy to be carried by a commuter or youth, too expensive for most to buy. Furthermore, turning is achieved through a handle bar structure that ascends from the platform upward toward the chest of a user. This tall steering structure is a trip hazard when a user makes an unplanned exit from the vehicle.

Another group of prior art two-wheel self-balancing vehicles has two platform sections, each associated with a given wheel, that tilt from side-to-side as a user leans left or right. The two platform sections move in a linked or "dependent" manner (for example, through a parallelogram frame, and not independently) and there is a single "vertical" axis for the platforms. When the axis is tilted directly forward or backward, both wheels drive at the same speed (as required for self-balancing). If a user leans to the side (tilts the "vertical" axis sideways), then the outside wheel is driven faster than the inside wheel to effect a turn toward the direction of the tilt.

These devices typically require a multi-component parallelogram structure to coordinate/link movement of the two platform sections and the wheels. Such componentry adds to the weight, bulk, complexity, and potential for mechanical failure of the device. Also, the turning radius is fairly large as one wheel is typically rotating around the other (moving in the same direction though at different speeds).

A need exists for a two-wheel self-balancing vehicle that provides independent wheel control, is light-weight and compact, is easy and safe to use, and that may be made in a cost-effective manner. A need also exits for a two-wheel self-balancing vehicle that is more maneuverable and more ergonomic (functioning more naturally with the bio-mechanics of a user's legs and body) than prior art devices.

Other prior art includes skateboards that have two platforms sections that are movable with respect to one another. Some have a shared shaft about which the two platform sections pivot, while others have a degree of flexibility in the platform. In both of these arrangements, the platform sections are arranged longitudinally, one primarily behind the other in the longitudinal line-of-direction of travel.

SUMMARY OF THE INVENTION

Accordingly, it is an object of the present invention to provide a two-wheel, self-balancing vehicle that overcomes the shortcomings of the prior art.

It is another object of the present invention to provide a two-wheel, self-balancing vehicle that has independently movable foot placement sections.

It is also an object of the present invention to provide such a two-wheel, self-balancing vehicle in which the independently movable foot placement sections are used by an operator to assert independent control over the driving of the wheel associated with the respective foot placement section.

These and related objects of the present invention are achieved by use of a two-wheel, self-balancing vehicle with independently movable foot placement sections as described herein.

The attainment of the foregoing and related advantages and features of the invention should be more readily apparent to those skilled in the art, after review of the following more detailed description of the invention taken together with the drawings.

DETAILED DESCRIPTION

Figure 1:
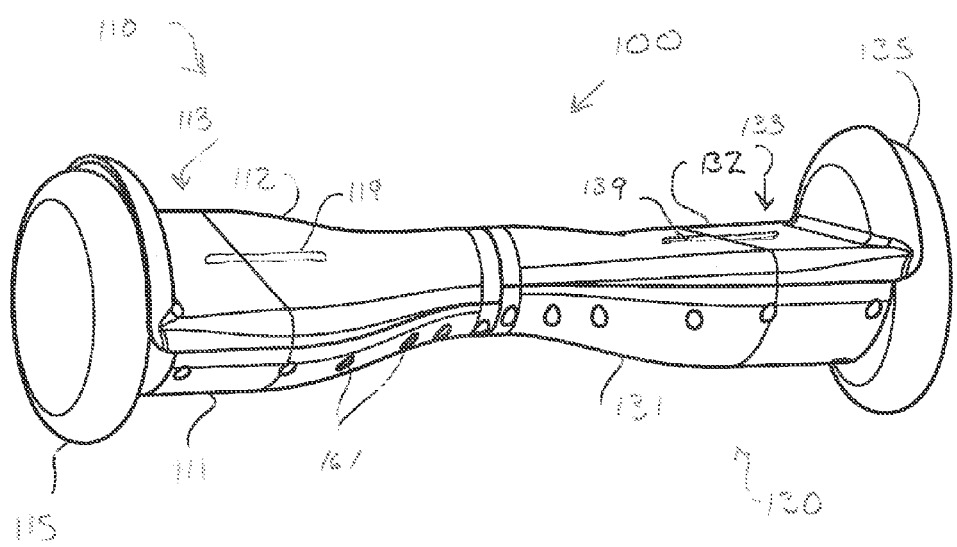
FIG. 1 is a perspective view of a two-wheel, self-balancing vehicle with independently movable platform sections in accordance with the present invention.

Referring to FIG. 1, is a perspective view of a two-wheel, self-balancing vehicle 100 with independently movable platform sections in accordance with the present invention is shown.

Vehicle 100 may have a first and a second platform section 110,130. Each platform section 110,130 may include a housing formed of a bottom housing member 111,131 and a top housing member 112,132. The top housing members may have a foot placement section or area 113,133 formed integrally therewith or affixed thereon. The foot placement section is preferably of sufficient size to receive the foot of a user and may include a tread or the like for traction and/or comfort.

The housing may be formed of metal, sturdy plastic or other suitable material. The housing members may be molded and incorporate strengthening reinforcements, and be shaped to receive and "nest" the internal components (discussed below) of the vehicle. The bottom and top housing sections are formed complementarily so that after the internal components are installed, the top housing section is fitted onto the bottom housing section and secured with screws or other fasteners. FIG. 1 illustrates holes 161, through which the fasteners are inserted.

Figure 2:
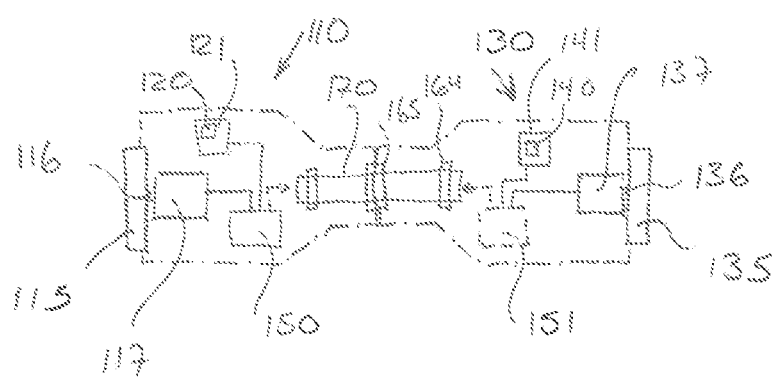
FIG. 2 is a block diagram of components within the vehicle of FIG. 1.

Each platform section includes a wheel 115,135, and each wheel preferably has an axle 116,136 and motorized hub assembly 117,137 (shown in FIG. 2). Motorized hub assemblies are known in the art.

Referring to FIG. 2, a block diagram of components within vehicle 100 in accordance with the invention is shown. The dot-dash line represents a rough outline of the housing members. Each platform section preferably includes a position sensor 120,140, which may be a gyroscopic sensor, for independent measurement of the position of the respective platform section. The sensors are preferably mounted on circuit boards 121,141 that may be attached to the interior of the respective bottom housings. Sensed position information from sensor 120,140 is used to drive the corresponding motor 117,137 and wheel 115,135. The control logic for translating position data to motor drive signals may be centralized or split between the two platform sections. For example, control logic 150 may be electrically connected to sensors 120,140 and to drive motors 117,137, electrical conduits connecting through the connecting shaft 170 between sensor 140, control logic 150, and drive motor 137.

Alternatively, a separate processor/control logic 151 may be provided in the second platform section 130. Logic 151, in this case, would be is connect directly to sensor 140 and drive motor 137 and generate drive signals to motor 137 (and wheel 135) based data from sensor 140.

Communication between these components is primarily in the direction of data from the sensor and drive signals to the motor. However, communication in the other direction may include start signals (ie, to the sensor), status signals (ie, from the motor indicating an unsafe condition (e.g., excessive rpm), or a motor/drive failure or irregularity). This information, in addition to battery information, etc., could be communicated back to a user via lights or another interface, or communicated wirelessly (e.g., blue-tooth) from the vehicle to a hand-held device such as a mobile phone. In addition, if the platform sections have separate and independent control logic 150,151, these processing units may still share information with one another, such as status, safe operation information, etc.

The two platform sections 110,130 are movably coupled to one another. FIG. 2 illustrates a shaft 170 about which they may rotate (or pivot with respect to one another). Brackets 164 and flange brackets 165 may secure the shaft to the platform sections, with the flange brackets preferably configured to prevent or reduce the entry of dirt or moisture within the housings. Shaft 170 may be hollow in part and thereby allowing for the passage of conduits therethrough. Pivoting or rotating shaft arrangements are known in the art, and others may be used without deviating from the present invention as long as the foot placement sections may move independently.

Since the platform sections may rotate or pivot with respect to one another, the left section 110, for example, may tilt forward while the right section tilts backward. This would cause the wheels to be driven in opposite directions, causing a user to spin-in-place or "pirouette" much like a figure skater. Alternatively, the platform wheels could be tilted in the same direction, but one platform more than the other. This would cause the wheel associated with the more steeply tilted platform to drive faster, in turn causing the vehicle to turn. The sharpness of the turn could be readily adjusted by the user based on the relative tilt of the platform sections.

This leg movement to control turning is a very ergonomic and natural movement, akin to skiing and other gliding/sliding activities.

The rotating shaft 170 may also include a bias mechanism integral with the flange bracket 165 or otherwise configured to return the platform section to an even level in the absence of displacement from a riders weight.

Each platform section 110,130 may also include a platform or "shut-off" sensor 119,139 that detects when a user is standing of the platform. When a user falls off, the absence of the rider is sensed and the control logic in response stops driving the wheels such that the vehicle comes to a stop (and does not carry on rider less). In the absence of such a shut-off sensor, the vehicle would still stop rather soon as the wheels will be driven to a self-balancing position for their respective sections bringing the device to rest.

Figure 3:
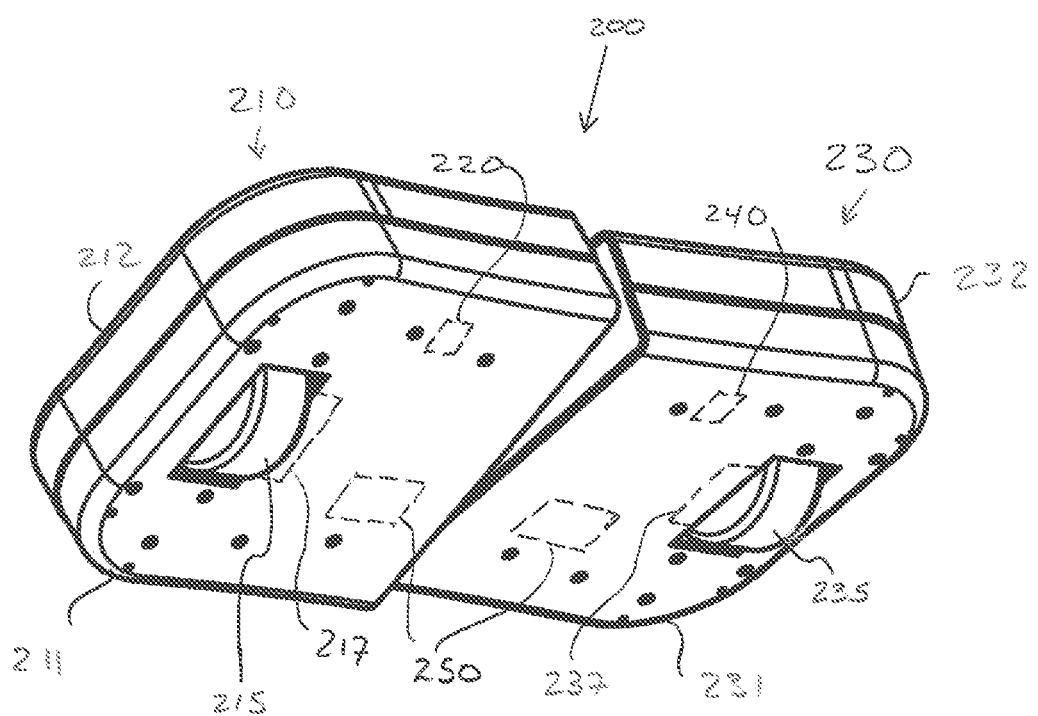
FIG. 3 is a bottom perspective view of another embodiment of a two-wheel, self-balancing vehicle with independently movable platform sections in accordance with the present invention.

Referring to FIG. 3, a bottom perspective view of another embodiment of a two-wheel, self-balancing vehicle 200 with independently movable platform sections in accordance with the present invention is shown. Vehicle 200 may include first and second platform section 210,230 that are formed of bottom 211,231 and top 212,232 housing sections, similar to those in vehicle 100 above.

Each platform section includes a wheel 215,235 which is respectively driven by a motorized hub 217,237 and an associated position sensor 220,240. Control logic 250 receives the sensed position information and drives the associated wheel toward self-balancing. As discussed above, the control logic 250 may be independent, provided in each platform section, or centralized, provided in one section. Regardless, the driving of each wheel is based on the position sensed by the sensor associated with that wheel.

A pivoting shaft or other arrangement may be used to movably/rotatably join the two platform sections.

Figure 4:
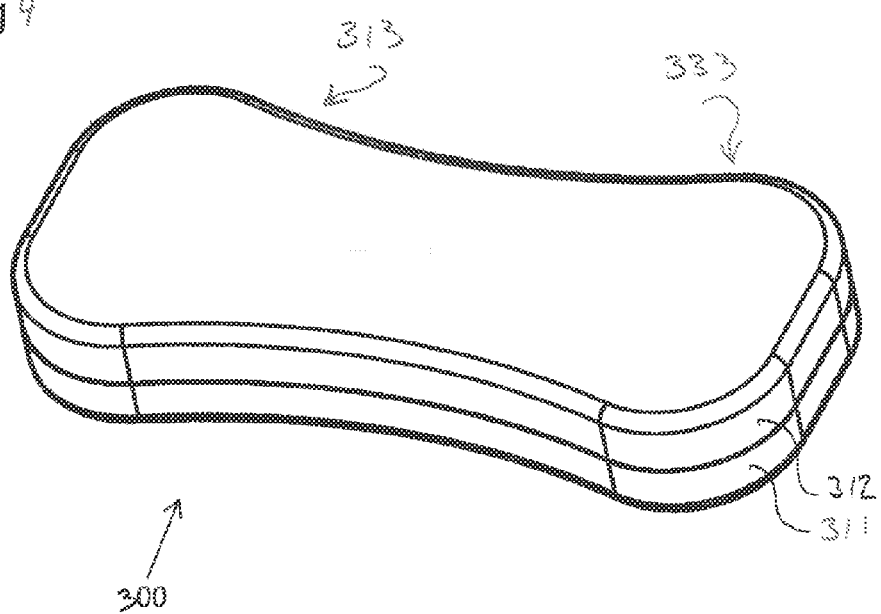
FIGS. 4-5 are a top perspective view and a bottom perspective view of another embodiment of a two-wheel, self-balancing vehicle with independently movable platform sections in accordance with the present invention.
Figure 5:
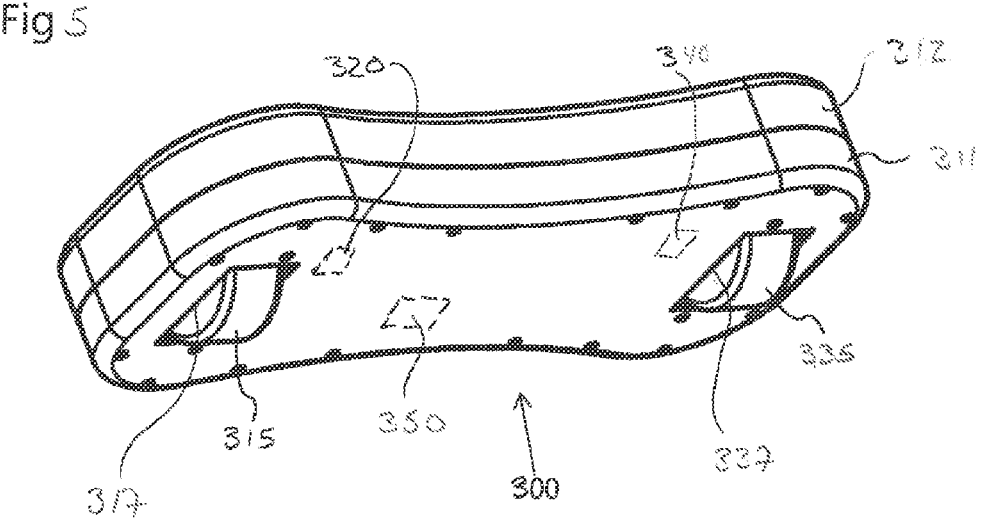

Referring to FIGS. 4-5, a top perspective view and a bottom perspective view of another embodiment of a two-wheel, self-balancing vehicle with independently movable platform sections 300 in accordance with the present invention is shown. Vehicle 300 is similar to the other vehicles herein, yet instead of a pivoting or rotating connection between platform sections, the frame or housing is made of a sturdy yet sufficiently flexible material that the two foot placement sections are effectively first and second platform sections that move independently with respect to each other for independent control of wheels 315,335.

Vehicle 300 may include a bottom 311 and a top 312 housing sections. These may be made of a flexible steel or durable flexible plastic or the like. The two sections are preferably configured to receive the internal components. They are preferably complementary in shape and may be secured by fasteners from below. The top housing may include or have attached to it a rubber coating or surface or the like in the foot placement areas 313,333 to increase traction and/or comfort with the foot of a user.

The internal components may include position sensors for both sections 320,340, hub motors 317,337, and control logic 350 for independently driving wheels 315,335 toward a self-balancing position based on position information sensor by their respective sensors 320,340. These components may be the same or similar to those discussed above for vehicles 100 and 200 (FIGS. 1-3).

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A two-wheel, self-balancing vehicle device, comprising:
   a first foot placement section and a second foot placement section that are coupled to one another and are independently movable with respect to one another;
   a first wheel associated with the first foot placement section and a second wheel associated with the second foot placement section, the first and second wheels being spaced apart and substantially parallel to one another;

a first position sensor and a first drive motor configured to drive the first wheel, a second position sensor and a second drive motor configured to drive the second wheel; and control logic that drives the first wheel toward self-balancing the first foot placement section in response to position data from the first sensor and that drives the second wheel toward self-balancing the second foot placement section in response to position data from the second foot placement section.

2. The device of claim 1, wherein the first foot placement section and the second foot placement section are rotatably coupled to one another.

3. The device of claim 1, wherein the first foot placement section and the second foot placement section are positioned substantially linearly between the first and second wheel.

4. The device of claim 1, wherein said first and second foot placement sections are mounted to a frame that is sufficiently flexible that the first and second foot placement platforms can move independently with respect to one another under the weight of a user.

5. The device of claim 1, further comprising:

a first housing section on which the first foot placement section is provided, the first housing section housing the first sensor and first drive motor; and a second housing section on which the second foot placement section is provided, the second housing section housing the second sensor and second drive motor.

6. The device of claim 5, wherein the control logic include a first control logic controlling the first drive motor located in the first housing section and a second control logic controlling the second drive motor located in the second housing section.

7. The device of claim 5, wherein the first drive wheel extends from the first housing section on an end substantially opposite where the first housing section is coupled to the second housing section, and the second drive wheel extends from the second housing section on an end substantially opposite where the second housing section is coupled to the first housing section.

8. The device of claim 1, further comprising a platform sensor provided at at least one of the first and second foot placement sections that detects when a user is standing on that foot placement section.

9. The device of claim 1, further comprising a bias mechanism for returning the two independently movable first and second foot placement sections toward alignment in the absence of a force by a user displacing the two foot placement sections from alignment.

\* \* \* \* \*